United States Patent
Lee et al.

(10) Patent No.: US 9,578,338 B1
(45) Date of Patent: Feb. 21, 2017

(54) METHOD AND APPARATUS FOR ENCODING IMAGE, AND METHOD AND APPARATUS FOR DECODING IMAGE

(71) Applicant: KT CORPORATION, Gyeonggi-do (KR)

(72) Inventors: Bae Keun Lee, Gyeonggi-do (KR); Jae Cheol Kwon, Daejeon (KR); Joo Young Kim, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 15/292,478

(22) Filed: Oct. 13, 2016

Related U.S. Application Data

(63) Continuation of application No. 15/218,403, filed on Jul. 25, 2016, now Pat. No. 9,497,477, which is a
(Continued)

(30) Foreign Application Priority Data

Nov. 8, 2011 (KR) .................. 10-2011-0116130
Nov. 2, 2012 (KR) .................. 10-2012-0123519

(51) Int. Cl.
*H04N 19/00* (2014.01)
*H04N 19/159* (2014.01)
(Continued)

(52) U.S. Cl.
CPC ......... *H04N 19/159* (2014.11); *H04N 19/105* (2014.11); *H04N 19/117* (2014.11);
(Continued)

(58) Field of Classification Search
CPC ..................... H04N 19/523; H04N 19/59
(Continued)

(56) References Cited

U.S. PATENT DOCUMENTS 7,349,473 B2 3/2008 Hallapuro et al.
8,428,396 B2 4/2013 He et al.
(Continued)

FOREIGN PATENT DOCUMENTS

CA 2491679 A1 1/2004
CN 1666429 A 9/2005
(Continued)

OTHER PUBLICATIONS

Thomas Wiegand et al., "WD3: Working Draft 3 of High-Efficiency Video Coding", Joint Collaborative Team on Video Coding (JCT-VC) of ITU-T SG16 WP3 and ISO/IEC JTC1/SC29/WG11 5th Meeting: Geneva, CH, Mar. 16-23, 2011, Document: JCTVC-E603.
(Continued)

*Primary Examiner* — Jeffery Williams
(74) *Attorney, Agent, or Firm* — IP Legal Services, LLC

(57) ABSTRACT

The present invention discloses a method and an apparatus for encoding and decoding video. A video decoding method comprises reconstructing a residual value by entropy-decoding received bitstream and dequantizing and inverse-transforming residual value information, generating a final prediction unit by performing inter prediction on a prediction unit which is partitioned from a coding unit into at least two prediction units by asymmetric motion partitioning (AMP), the two partitioned prediction units comprising a first partitioned prediction unit and a second partitioned prediction unit, and reconstructing a picture by adding the final prediction unit to the residual values.

4 Claims, 10 Drawing Sheets

Related U.S. Application Data continuation of application No. 14/357,056, filed as application No. PCT/KR2012/009180 on Nov. 2, 2012, now Pat. No. 9,432,683.

(51) Int. Cl.
| | |
|---|---|
| *H04N 19/13* | (2014.01) |
| *H04N 19/124* | (2014.01) |
| *H04N 19/61* | (2014.01) |
| *H04N 19/44* | (2014.01) |
| *H04N 19/117* | (2014.01) |
| *H04N 19/105* | (2014.01) |
| *H04N 19/52* | (2014.01) |
| *H04N 19/172* | (2014.01) |
| *H04N 19/184* | (2014.01) |
| *H04N 19/176* | (2014.01) |

(52) U.S. Cl.
CPC ........... *H04N 19/124* (2014.11); *H04N 19/13* (2014.11); *H04N 19/45* (2014.11); *H04N 19/52* (2014.11); *H04N 19/61* (2014.11); *H04N 19/172* (2014.11); *H04N 19/176* (2014.11); *H04N 19/184* (2014.11)

(58) Field of Classification Search
USPC ..................................................... 375/240.12
See application file for complete search history.

(56) References Cited

U.S. PATENT DOCUMENTS

| | | |
|---|---|---|
| 9,137,533 B2 | 9/2015 | Lee et al. |
| 2004/0057523 A1 | 3/2004 | Koto et al. |
| 2004/0062307 A1 | 4/2004 | Hallapuro et al. |
| 2004/0213470 A1 | 10/2004 | Sato et al. |
| 2009/0022220 A1 | 1/2009 | Vatis et al. |
| 2009/0067501 A1 | 3/2009 | Boon et al. |
| 2011/0211640 A1 | 9/2011 | Kim et al. |
| 2012/0134425 A1 | 5/2012 | Kossentini et al. |
| 2012/0288007 A1 | 11/2012 | Lee et al. |
| 2013/0022117 A1 | 1/2013 | Lou et al. |
| 2013/0089265 A1 | 4/2013 | Yie et al. |
| 2013/0101016 A1* | 4/2013 | Chong .................. H04N 19/82 375/240.02 |
| 2013/0108182 A1 | 5/2013 | Yie et al. |
| 2013/0129237 A1 | 5/2013 | Yie et al. |
| 2013/0177079 A1 | 7/2013 | Kim et al. |
| 2015/0010079 A1 | 1/2015 | Yie et al. |
| 2015/0010080 A1 | 1/2015 | Yie et al. |
| 2015/0010081 A1 | 1/2015 | Yie et al. |
| 2015/0010085 A1 | 1/2015 | Yie et al. |
| 2015/0010086 A1 | 1/2015 | Yie et al. |
| 2015/0010243 A1 | 1/2015 | Yie et al. |
| 2015/0010244 A1 | 1/2015 | Yie et al. |
| 2015/0016737 A1 | 1/2015 | Yie et al. |
| 2015/0016738 A1 | 1/2015 | Yie et al. |
| 2015/0016739 A1 | 1/2015 | Yie et al. |
| 2015/0016740 A1 | 1/2015 | Yie et al. |
| 2015/0016741 A1 | 1/2015 | Yie et al. |
| 2015/0189311 A1 | 7/2015 | Kim et al. |
| 2015/0208091 A1 | 7/2015 | Yie et al. |
| 2015/0256841 A1 | 9/2015 | Yie et al. |
| 2015/0264352 A1 | 9/2015 | Yie et al. |
| 2015/0281688 A1 | 10/2015 | Yie et al. |
| 2015/0288981 A1 | 10/2015 | Kim et al. |
| 2015/0288982 A1 | 10/2015 | Kim et al. |
| 2015/0288984 A1 | 10/2015 | Kim et al. |

FOREIGN PATENT DOCUMENTS

| | | |
|---|---|---|
| CN | 101399991 A | 4/2009 |
| JP | 2004-007337 A | 1/2004 |
| JP | 2011-082725 A | 4/2011 |
| KR | 10-2005-0018948 A | 2/2005 |
| KR | 10-2011-0061468 A | 6/2011 |
| KR | 10-2011-0084121 A | 7/2011 |
| RU | 2007141925 A | 5/2009 |
| WO | 2006/108654 A2 | 10/2006 |
| WO | 2010/050706 A2 | 5/2010 |
| WO | 2011/068360 A2 | 6/2011 |

OTHER PUBLICATIONS

Sunil Lee et al., "High-Efficiency Video Compression Framework Based on Flexible Unit Representation", Proceedings of the Second APSIPA Annual Summit and Conference, Dec. 14-17, 2010, pp. 623-631.

* cited by examiner

FIG. 3

METHOD AND APPARATUS FOR ENCODING IMAGE, AND METHOD AND APPARATUS FOR DECODING IMAGE

CROSS REFERENCE TO RELATED APPLICATIONS

This application is a Continuation of U.S. patent application Ser. No. 15/218,403 (filed on Jul. 25, 2016), which is a Continuation of U.S. patent application Ser. No. 14/357,056 (filed on May 8, 2014), now issued as U.S. Pat. No. 9,432,683, which is a National Stage Patent Application of PCT International Patent Application No. PCT/KR2012/009180 (filed on Nov. 2, 2012) under 35 U.S.C. §371, which claims priority to Korean Patent Application Nos. 10-2011-0116130 (filed on Nov. 8, 2011) and 10-2012-0123519 (filed on Nov. 2, 2012), the teachings of which are incorporated herein in their entireties by reference.

BACKGROUND

The present invention relates to image processing, and more particularly, to an inter prediction method and an inter prediction apparatus.

Recently, demands for high-resolution and high-quality videos, such as high-definition (HD) and ultrahigh-definition (UHD) videos, are increasing.

To provide videos with higher resolution and higher quality, the amount of video data increases. Accordingly, costs of transferring and storing video data rise so as to provide high-quality videos as compared with conventional video data processing methods. In order to solve these problems occurring with an increase in resolution and quality of video data, high-efficiency video compression techniques may be utilized.

As video data compression technology, various schemes are used such as inter prediction of predicting pixel values included in a current picture from other pictures, intra prediction of predicting pixel values included in a current picture using information on other pixels than the current picture, and entropy encoding/decoding of allocating shorter codes to frequently occurring or appearing signals.

SUMMARY

An aspect of the present invention is to provide a video encoding method and a video encoding apparatus which are capable of increasing video encoding performance.

Another aspect of the present invention is to provide a video decoding method and a video decoding apparatus which are capable of increasing video decoding performance.

Still another aspect of the present invention is to provide an inter encoding method and an inter encoding apparatus which are capable of increasing video encoding performance.

An embodiment of the present invention provides a video decoding method including reconstructing a residual value by entropy-decoding a received bitstream and dequantizing and inverse-transforming residual value information, generating a final prediction unit by performing inter prediction on a prediction unit which is partitioned form a coding unit into at least two prediction units by asymmetric motion partitioning (AMP), the two partitioned prediction units including a first partitioned prediction unit and a second partitioned prediction unit, and reconstructing a picture by adding the final prediction unit to the residual value, wherein the generating of the final prediction unit includes performing interpolation using a filter tap with a variable length based on a horizontal length or a vertical length of the first partitioned prediction unit so that pixels in the second partitioned prediction unit are not involved in interpolation.

The generating of the final prediction unit may include performing interpolation for the first partitioned prediction unit and performing interpolation for the second partitioned prediction unit using filter taps with different lengths based on a horizontal length or a vertical length of the prediction unit.

The generating of the final prediction unit may include performing horizontal interpolation for the first partitioned prediction unit using a horizontal filter tap shorter than a vertical filter tap when the first partitioned prediction unit is asymmetric and short in a horizontal direction.

The generating of the final prediction unit may include performing vertical interpolation for the first partitioned prediction unit using a vertical filter tap shorter than a horizontal filter tap when the first partitioned prediction unit is asymmetric and short in a vertical direction.

The generating of the final prediction unit may include performing horizontal interpolation for the first partitioned prediction unit using a horizontally short filter tap shorter than a filter tap for the second partitioned prediction unit which is horizontally long when the first partitioned prediction unit is asymmetric and short in a horizontal direction.

The generating of the final prediction unit may include performing vertical interpolation for the first partitioned prediction unit using a vertically short filter tap shorter than a filter tap for the second partitioned prediction unit which is vertically long when the first partitioned prediction unit is asymmetric and short in a vertical direction.

A 4-tap filter may be used for the first partitioned prediction unit in vertical interpolation and a 6-tap filter is used for the second partitioned prediction unit in vertical interpolation when a 64×64 unit to be predicted is asymmetrically partitioned in a vertical direction into 2N×nU or 2N×nD prediction units, N being a natural number, a 2N×nU prediction unit being a partitioned form having an upper block with a smaller area, and a 2N×nD prediction unit being a partitioned form having a lower block with a smaller area, and a 4-tap filter may be used for the first partitioned prediction unit in horizontal interpolation and a 6-tap filter is used for the second partitioned prediction unit in horizontal interpolation when the 64×64 unit to be predicted is asymmetrically partitioned in a horizontal direction into nL×2N or nR×2N prediction units, N being a natural number, an nL×2N prediction unit being a partitioned form having a left block with a smaller area, and an nR×2N prediction unit being a partitioned form having a right block with a smaller area.

A total length of filter taps in an asymmetric direction of the first and the second partitioned prediction units may be larger than a length of a filter tap in a direction other than the asymmetric direction.

The received bitstream may include information on a prediction mode and a form of a prediction unit corresponding to the decoding target block.

The received bitstream may further include information on a length of an interpolation filter tap of the prediction unit corresponding to the decoding target block.

The generating of the final prediction unit may include acquiring, from the bitstream, partition information on which direction the partitioned prediction units are asymmetrical; determining, based on the partition information, which asymmetric direction the partitioned prediction units have a longer length; determining a length of a filter tap to be used for interpolation based on a determination result; and performing interpolation using the determined filter tap.

Another embodiment of the present invention provides a video decoding apparatus including a residual value reconstructing module to reconstruct a residual value by entropy-decoding a received bitstream and dequantizing and inverse-transforming residual value information, a final prediction unit generating module to generate a final prediction unit by performing inter prediction on a prediction unit which is partitioned from a coding unit into at least two prediction units by AMP, the two partitioned prediction units including a first partitioned prediction unit and a second partitioned prediction unit; and a picture reconstructing module to reconstruct a picture by adding the final prediction unit to the residual value, wherein the final prediction unit generating module performs interpolation using a filter tap with a variable length based on a horizontal length or a vertical length of the first partitioned prediction unit so that pixels in the second partitioned prediction unit are not involved in interpolation.

Still another embodiment of the present invention provides a video encoding method including performing inter prediction on a prediction unit obtained by partitioning an input picture using AMP to predict and encode the picture, the partitioned prediction unit including a first partitioned prediction unit and a second partitioned prediction unit, and transforming and quantizing a residual value that is a difference between a prediction unit generated by the inter prediction and a current prediction unit, and entropy-encoding thereon, wherein the performing of the inter prediction includes performing interpolation using a filter tap with a variable length based on a horizontal length or a vertical length of the first partitioned prediction unit so that pixels in the second partitioned prediction unit are not involved in interpolation.

The performing of the inter prediction may include performing interpolation for the first partitioned prediction unit and performing interpolation for the second partitioned prediction unit using filter taps with different lengths based on a horizontal length or a vertical length of the prediction units.

The performing of the inter prediction may include performing horizontal interpolation for the first partitioned prediction unit using a horizontal filter tap shorter than a vertical filter tap when the first partitioned prediction unit is asymmetric and short in a horizontal direction.

The performing of the inter prediction may include performing horizontal interpolation using a horizontally short filter tap shorter than a filter tap for the second partitioned prediction unit which is horizontally long when the first partitioned prediction unit is asymmetric and short in a horizontal direction.

A total length of filter taps in an asymmetric direction of the first and the second partitioned prediction units may be larger than a length of a filter tap in a direction other than the asymmetric direction.

The performing of the inter prediction may include acquiring information on which direction the partitioned prediction units are asymmetrical; determining, based on the obtained information, which asymmetric direction the partitioned prediction units have a longer length; determining a length of a filter tap to be used for interpolation based on a determination result; and performing interpolation using the determined filter tap.

The transforming and quantizing a residual value, and entropy-encoding thereon comprises generating a bitstream, and wherein the bitstream comprises information on a length of an interpolation filter tap of the prediction unit corresponding to an encoding target block Yet another embodiment of the present invention provides a video encoding apparatus including an inter prediction module to perform inter prediction on a prediction unit obtained by partitioning an input picture using AMP to predict and encode the picture, the partitioned prediction unit including a first partitioned prediction unit and a second partitioned prediction unit, and an entropy encoding module to entropy-encode a residual value which is transformed and/or quantized, wherein the residual value is a difference between a prediction unit generated by the inter prediction and a current prediction unit, and wherein the inter prediction module performs interpolation using a filter tap with a variable length based on a horizontal length or a vertical length of the first partitioned prediction unit so that pixels in the second partitioned prediction unit are not involved in interpolation.

According to a video encoding method and a video encoding apparatus of the present invention, video encoding performance may be enhanced.

According to a video decoding method and a video decoding apparatus of the present invention, video decoding performance may be enhanced.

According to an inter prediction encoding method and an inter prediction encoding apparatus of the present invention, video encoding/decoding performance may be enhanced.

BRIEF DESCRIPTION OF THE DRAWINGS

FIG. 3 schematically illustrates interpolation in inter prediction according to an exemplary embodiment of the present invention.

DETAILED DESCRIPTION OF EMBODIMENTS

Figure 1:
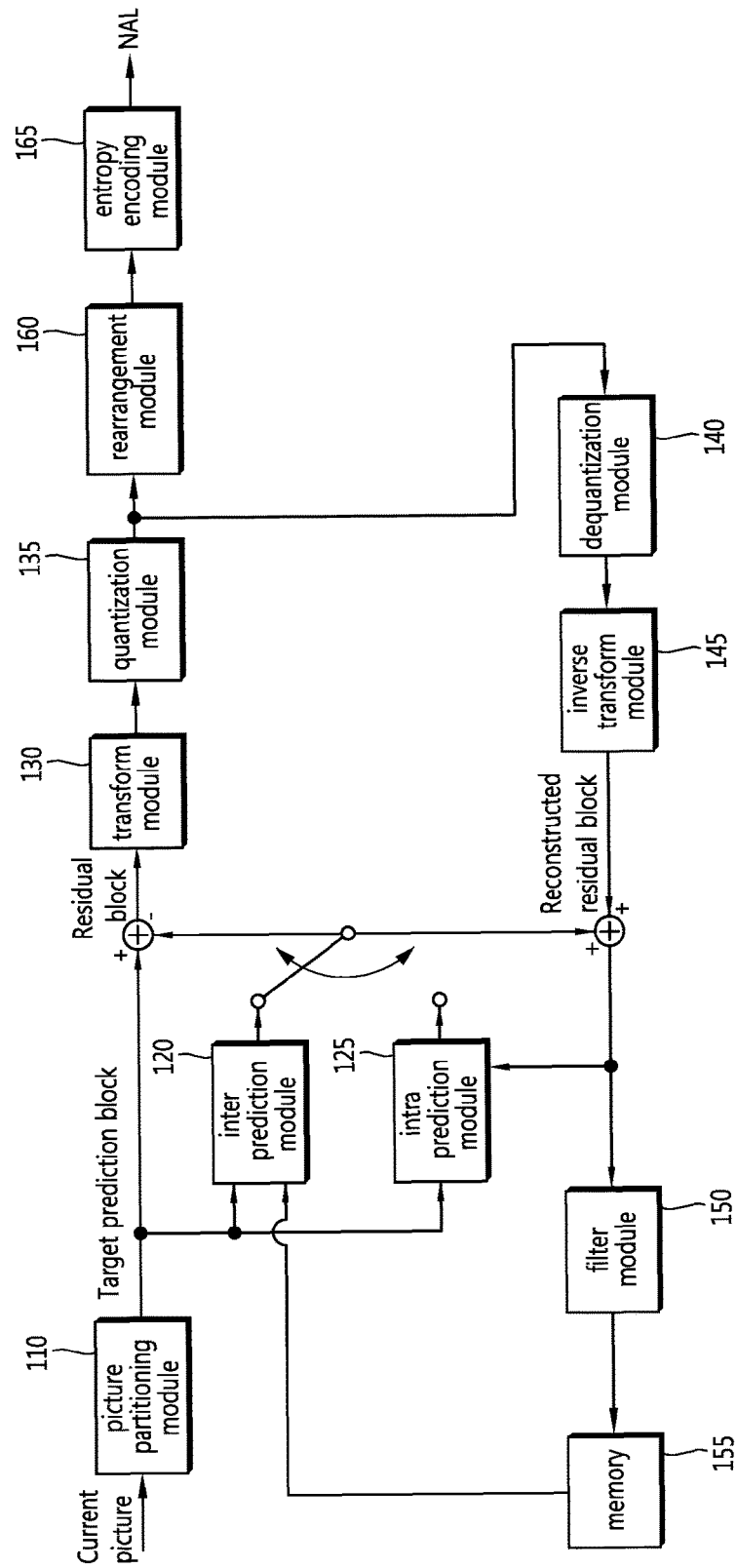
FIG. 1 is a block diagram illustrating a configuration of a video encoding apparatus according to an exemplary embodiment of the present invention.

The present invention may be changed and modified variously and be illustrated with reference to different exemplary embodiments, some of which will be described and shown in the drawings.

However, these embodiments are not intended for limiting the invention but are construed as including includes all modifications, equivalents and replacements which belong to the spirit and technical scope of the invention.

Although the terms first, second, etc. may be used to describe various elements, these elements should not be limited by these terms. These terms are used only to distinguish one element from another element. For example, a first element could be termed a second element and a second element could be termed a first element likewise without departing from the teachings of the present invention. The term "and/or" includes any and all combinations of a plurality of associated listed items.

It will be understood that when an element is referred to as being "connected to" or "coupled to" another element, the element can be directly connected or coupled to another element or intervening elements. On the contrary, when an element is referred to as being "directly connected to" or "directly coupled to" another element, there are no intervening elements present.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "include" and/or "have," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the invention will be described in detail with reference to the accompanying drawings. For ease of understanding, like reference numerals in the drawings refer to like elements throughout, and redundant descriptions of like elements will be omitted herein.

FIG. 1 is a block diagram illustrating a configuration of a video encoding apparatus according to an exemplary embodiment of the present invention. Referring to FIG. 1, the video encoding apparatus may include a picture partition module 110, an inter prediction module 120, an intra prediction module 125, a transform module 130, a quantization module 135, a dequantization module 140, an inverse transform module 145, a module filter 150, a memory 155, a rearrangement module 160 and an entropy encoding module 165.

The picture partition module 110 may divide an input picture into one or more coding units. A coding unit (CU) is a unit of encoding performed by the video encoding apparatus and may be recursively split with depth information based on a quadtree structure. A CU may have different sizes of 8×8, 16×16, 32×32 and 64×64. A CU with a maximum size is referred to as a largest coding unit (LCU), and a CU with a minimum size as a smallest coding unit (SCU).

The picture partition module 110 may divide a CU to generate a prediction unit (PU) and the picture partition module 110 may divide a CU to generate a transform unit (TU). A PU may be smaller than or the same as a CU, and may not necessarily be a square block but be a rectangular block.

Generally, intra prediction may be performed by 2N*2N or N*N blocks. Here, N is a natural number, representing a number of pixels, and 2N*2N or N*N may represent a PU size (and/or partition mode). However, in short distance intra prediction (SDIP), not only a 2N*2N PU but a further subdivided PU with a size of hN*2N/2N*hN (here, h=1/2) may be also used to increase efficiency in intra prediction. When an hN*2N PU or 2N*hN PU is used, directionality of a boundary in a block may be reflected well, and accordingly energy of a prediction error signal may be decreased to reduce an amount of bits needed for encoding, thereby increasing encoding efficiency.

Inter prediction may be performed by 2N*2N, 2N*N, N*2N or N*N blocks. Here, N is a natural number, representing a number of pixels, and 2N*2N, 2N*N, N*2N or N*N may represent a PU size (and/or partition mode). Further, inter prediction may be performed in the unit of 2N×nU PU, 2N×nD PU, nL×2N PU or nR×2N PU, in addition to the 2N*2N PU, 2N*N PU, N*2N PU or N*N PU, in order to enhance efficiency in inter prediction. Here, 2N×nU, 2N×nD, nL×2N or nR×2N may represent a PU size (and/or partition mode). In 2N×nU and 2N×nD partition modes, a PU may have a size of 2N×(1/2)N or 2N×(3/2)N, while in nL×2N and nR×2N partition modes, a PU may have a size of (1/2)N×2N or (3/2)N×2N.

In an inter prediction mode, the inter prediction module 120 may perform motion estimation (ME) and motion compensation (MC). The inter prediction module 120 may generate a prediction block based on information on at least one of previous and subsequent pictures of the current picture.

The inter prediction module 120 may perform motion estimation based on a split target prediction block and at least one reference block stored in the memory 155. The inter prediction module 120 may generate motion information including a motion vector (MV), a reference block index and a prediction mode, etc. as a result of motion estimation.

Further, the inter prediction module 120 may perform motion compensation using the motion information and the reference block. Here, the inter prediction module 120 may generate a prediction block from the reference block corresponding to an input block and output the predicted block.

In an intra prediction mode, the intra prediction module 125 may generate a prediction block based on information on a pixel in the current picture. In the intra prediction mode, the intra prediction module 125 may perform prediction for a current block based on a target prediction block and a reconstructed block previously reconstructed after transform and quantization. Here, the reconstructed block may be a reconstructed picture that has not been subjected to the filter module 150.

In the inter prediction mode or intra prediction mode described above, prediction may be performed on a prediction target block to generate a prediction block. Here, a residual block may be generated based on a differential value between prediction target block (original block) and the generated prediction block.

The transform module 130 may transform a residual block by a TU to generate a transform coefficient. A TU may have a tree structure within maximum and minimum sizes. It may be indicated through a flag whether a current block is split into sub-blocks by each TU. The transform module 130 may perform transform based on a discrete cosine transform (DCT) and/or discrete sine transform (DST).

The quantization module 135 may quantize values transformed by the transform module 130. A quantization coefficient may change based on a block or priority of a picture. The quantized transform coefficient may be provided to the rearrangement module 160 and the dequantization module 140.

The rearrangement module 160 may arrange a two-dimensional block of the quantized transform coefficients into a one-dimensional vector of transform coefficients by scanning so as to enhance efficiency in entropy encoding. The rearrangement module 160 may change a scanning order based on stochastic statistics to enhance entropy encoding efficiency.

The entropy encoding module 165 may entropy-encode the values obtained by the rearrangement module 160. In entropy encoding, a codeword with smaller number of bits may be allocated to a more frequently occurring syntax element value, while a codeword with more number of bits may be allocated to a less frequently occurring syntax element value. Thus, a size of a bit string for symbols to be encoded may be reduced to enhance video encoding compression performance. Various encoding methods, such as exponential Golomb coding, context-adaptive variable length coding (CAVLC) and/or context-adaptive binary arithmetic coding (CABAC), may be used for entropy encoding. The encoded information may be formed into a compressed bitstream and be transferred or stored through a network abstraction layer (NAL).

The dequantization module 140 may dequantize the transform coefficients quantized by the quantization module 135, and the inverse transform module 145 may inverse-transform the dequantized transform coefficients to generate a reconstructed residual block. The reconstructed residual block may be added to the prediction block generated by the inter prediction module 120 or the intra prediction module 125 to generate a reconstructed block. The reconstructed block may be provided to the intra prediction module 125 and the filter module 150.

The filter module 150 may perform a deblocking filter, a sample adaptive offset (SAO) and/or an adaptive loop filter (ALF) on the reconstructed residual block. Further, the deblocking filter may perform filtering on the reconstructed block so as to remove a distortion on boundaries between blocks occurring in encoding and decoding. The SAO is a loop filtering process to be performed on the block, for which the deblocking filtering process is completed, to reduce the difference from an original picture by a pixel. A band offset and an edge offset may be used as the SAO. The band offset may divide a pixel into 32 bands according to intensity and apply offsets to two divided groups of 16 bands on an edge area and 16 bands in a central area. The ALF may perform filtering so as to minimize an error between the target prediction block and the finally reconstructed block. The ALF may perform filtering based on a value obtained by comparing the reconstructed block filtered by the deblocking filter with the current target prediction block, and filter coefficient information on the ALF may be signaled in a slice header from the encoding apparatus to the decoding apparatus.

The memory 155 may store the finally reconstructed block via the filter module 150, and the finally reconstructed block may be provided to the inter prediction module 120 performing inter prediction.

Figure 2:
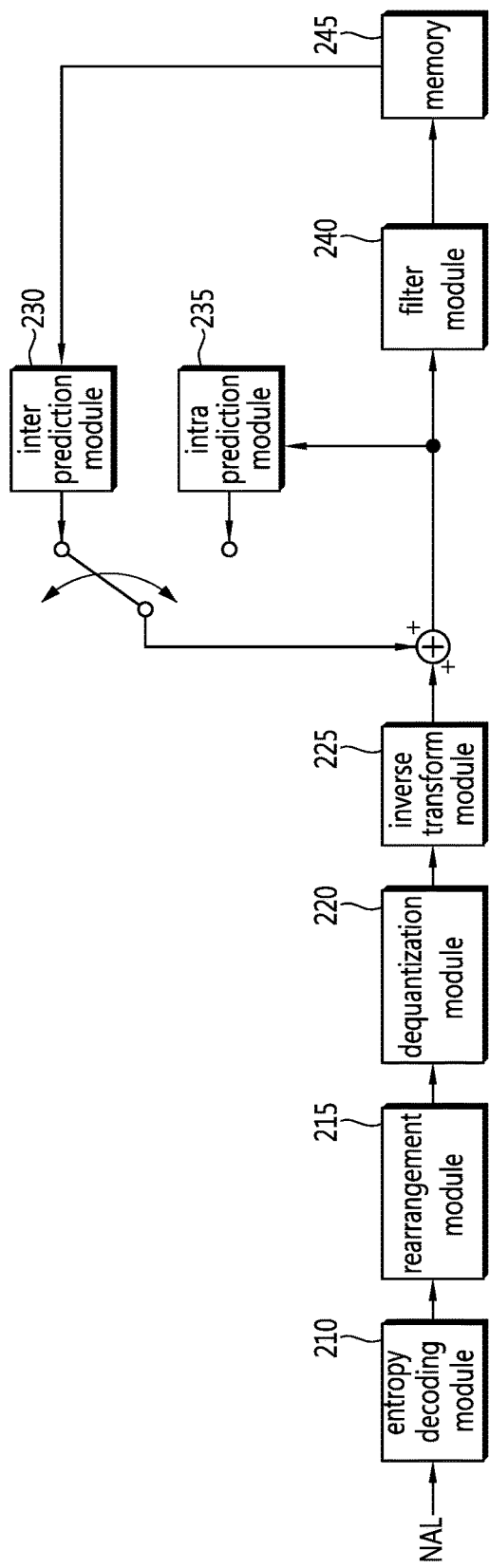
FIG. 2 is a block diagram illustrating a configuration of a video decoding apparatus according to an exemplary embodiment of the present invention.

FIG. 2 is a block diagram illustrating a configuration of a video decoding apparatus according to an exemplary embodiment of the present invention. Referring to FIG. 2, the video decoding apparatus may include an entropy decoding module 210, a rearrangement module 215, a dequantization module 220, an inverse transform module 225, an inter prediction module 230, an intra prediction module 235, a filter module 240 and a memory 245.

The entropy decoding module 210 may obtain a compressed bitstream from an NAL. The entropy decoding module 210 may entropy-decode the obtained bitstream, and also entropy-decode a prediction mode information and motion vector information if the bitstream includes the prediction mode information and the motion vector information. When entropy decoding is used, a codeword with smaller number of bits may be allocated to a more frequently occurring syntax element value, while a codeword with more number of bits may be allocated to a less frequently occurring syntax element value. Thus, a size of a bit string for symbols to be encoded may be reduced to enhance video decoding performance.

An entropy-decoded transform coefficient or residual signal may be provided to the rearrangement module 215. The rearrangement module 215 may inverse-scan the decoded transform coefficient or residual signal to generate a 2D block of transform coefficients.

The dequantization module 220 may dequantize the rearranged transform coefficients. The inverse transform module 225 may inverse-transform the dequantized transform coefficients to generate a residual block.

The residual block may be added to a prediction block generated by the inter prediction module 230 or intra prediction module 235 to generate a reconstructed block. The reconstructed block may be provided to the intra prediction module 235 and the filter module 240. The inter prediction module 230 and the intra prediction module 235 performs operations the same as or the equivalent to those of the inter prediction module 120 and the intra prediction module 125 of the video encoding apparatus, and thus descriptions thereof will be omitted herein.

The filter module 240 may perform filtering on the reconstructed block using a deblocking filter, an SAO and/or an ALF. The deblocking filter may perform filtering on the reconstructed blocks to remove a distortion on a boundary between blocks that occurs in encoding and decoding. The SAO may be applied to the reconstructed block, for which the deblocking filtering process is completed, to reduce a difference from an original picture by a pixel. The ALF may perform filtering on the reconstructed block for which the SAO is completed, so as to minimize an error between the target prediction block and the finally reconstructed block.

The memory 245 may store the finally reconstructed block obtained through the filter module 240, and the stored reconstructed block may be provided to the inter prediction module 230 performing inter prediction.

Hereinafter, a block may refer to a video encoding and decoding unit. Thus, in this specification, a block may mean a CU, PU or TU. Also, a encoding/decoding target block may collectively include a transform/inverse transform target block, if transform/inverse transform is performed, and a target prediction block, if prediction is performed.

Figure 3:
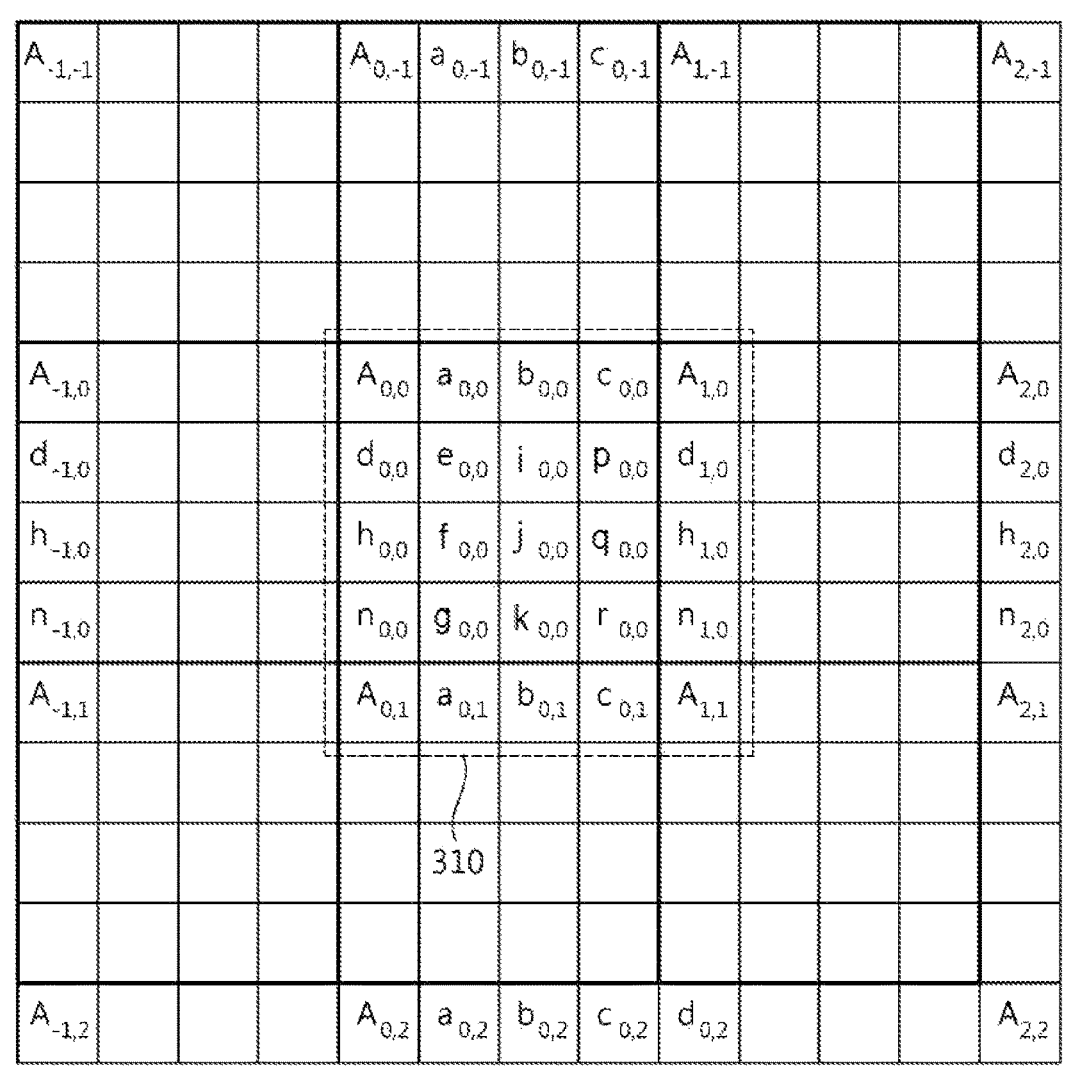

FIG. 3 schematically illustrates interpolation in inter prediction according to an exemplary embodiment of the present invention. As shown in FIG. 3, when the encoding apparatus (and/or decoding apparatus) generates a signal of a PU using motion information on inter prediction, an 8-tap interpolation filter may be used.

Referring to FIG. 3, interpolation is performed for each location in a horizontal direction or vertical direction to predict a pixel value (including luma and chroma values). As described above, using the 8-tap interpolation filter means that if a PU is a predetermined 4×4 block (e.g. indicating a current block 310), eight pixel values in the right direction and the left direction (i.e. in the horizontal direction) with respect to the 4×4 block or in the upward direction and downward direction (i.e. in the vertical direction) with respect to the 4×4 block are properly used in interpolation to predict pixel values of the current block 310. Although FIG. 3 illustrates usage of the 8-tap filter only, the present invention is not limited thereto.

In the present embodiment, 8-tap interpolation may be performed in the horizontal direction and then 8-tap interpolation may be performed in the vertical direction. First, assuming that a pixel value of a top left pixel of each 4×4 block is known, a pixel value of a pixel ($a_{0,0}$) just to the right of the top left pixel may be predicted by interpolation using pixel values of top left pixels of three 4×4 blocks on the left of the current block and pixel values of top left pixels of four 4×4 blocks on the right of the current block, which is expressed by the following equation.

$$a_{0,0}=(-A_{-3,0}+4*A_{-2,0}-10*A_{-1,0}+57*A_{0,0}+19*A_{1,0}-7*A_{2,0}+3*A_{3,0}-A_{4,0})\texttt{>>}\text{shift1}$$ [Equation 1]

Here, shift1=BitDepthY (Bit depth of Y component)−8. In this way, pixel values of other pixels in the current block 310 may be predicted by interpolation, which is expressed by the following equation.

$$b_{0,0}=(-A_{-3,0}+4*A_{-2,0}-11*A_{-1,0}+40*A_{0,0}+40*A_{1,0}-11*A_{2,0}+4*A_{3,0}-A_{4,0})\texttt{>>}\text{shift1}$$

$$c_{0,0}=(-A_{-3,0}+3*A_{-2,0}-7*A_{-1,0}+19*A_{0,0}+57*A_{1,0}-10*A_{2,0}+4*A_{3,0}-A_{4,0})\texttt{>>}\text{shift1}$$

$$d_{0,0}=(-A_{0,-3}+4*A_{0,-2}-10*A_{0,-1}+57*A_{0,0}+19*A_{0,1}-7*A_{0,2}+3*A_{0,3}-A_{0,4})\texttt{>>}\text{shift1}$$

$$h_{0,0}=(-A_{0,-3}+4*A_{0,-2}-11*A_{0,-1}+40*A_{0,0}+40*A_{0,1}-11*A_{0,2}+4*A_{0,3}-A_{0,4})\texttt{>>}\text{shift1}$$

$$n_{0,0}=(-A_{0,-3}+4*A_{0,-2}-7*A_{0,-1}+19*A_{0,0}+57*A_{0,1}-10*A_{0,2}+4*A_{0,3}-A_{0,4})\texttt{>>}\text{shift1}$$

$$e_{0,0}=(-a_{0,-3}+4*a_{0,-2}-10*a_{0,-1}+57*a_{0,0}+19*a_{0,1}-7*a_{0,2}+3*a_{0,3}-a_{0,4})\texttt{>>}\text{shift2}$$

$$f_{0,0}=(-a_{0,-3}+4*a_{0,-2}-11*a_{0,-1}+40*a_{0,0}+40*a_{0,1}-11*a_{0,2}+4*a_{0,3}-a_{0,4})\texttt{>>}\text{shift2}$$

$$g_{0,0}=(-a_{0,-3}+3*a_{0,-2}-7*a_{0,-1}+19*a_{0,0}+57*a_{0,1}-10*a_{0,2}+4*a_{0,3}-a_{0,4})\texttt{>>}\text{shift2}$$

$$i_{0,0}=(-b_{0,-3}+4*b_{0,-2}-10*b_{0,-1}+57*b_{0,0}+19*b_{0,1}-7*b_{0,2}+3*b_{0,3}-b_{0,4})\texttt{>>}\text{shift2}$$

$$j_{0,0}=(-b_{0,-3}+4*b_{0,-2}-11*b_{0,-1}+40*b_{0,0}+40*b_{0,1}-11*b_{0,2}+4*b_{0,3}-b_{0,4})\texttt{>>}\text{shift2}$$

$$k_{0,0}=(-b_{0,-3}+3*b_{0,-2}-7*b_{0,-1}+19*b_{0,0}+57*b_{0,1}-10*b_{0,2}+4*b_{0,3}-b_{0,4})\texttt{>>}\text{shift2}$$

$$p_{0,0}=(-c_{0,-3}+4*c_{0,-2}-10*c_{0,-1}+57*c_{0,0}+19*c_{0,1}-7*c_{0,2}+3*c_{0,3}-c_{0,4})\texttt{>>}\text{shift2}$$

$$q_{0,0}=(-c_{0,-3}+4*c_{0,-2}-11*c_{0,-1}+40*c_{0,0}+40*c_{0,1}-11*c_{0,2}+4*c_{0,3}-c_{0,4})\texttt{>>}\text{shift2}$$

$$r_{0,0}=(-c_{0,-3}+3*c_{0,-2}-7*c_{0,-1}+19*c_{0,0}+57*c_{0,1}-10*c_{0,2}+4*c_{0,3}-c_{0,4})\texttt{>>}\text{shift2}$$ [Equation 2]

Here, shift2=8. As shown in Equation 2, pixel values of three upper pixels and three left pixels other than the top left pixel of the current block 310 may be predicted by horizontal or vertical interpolation using pixel values of top left pixels of vertically or horizontally neighboring 4×4 blocks, and pixel values of remaining pixels may be predicted by vertical or horizontal interpolation using pixels values of upper pixels of seven 4×4 blocks vertically or horizontally neighboring. Using Equation 1 or 2, pixel values of a PU to be currently predicted may be derived and a prediction signal related to the PU may be generated.

Figure 4:
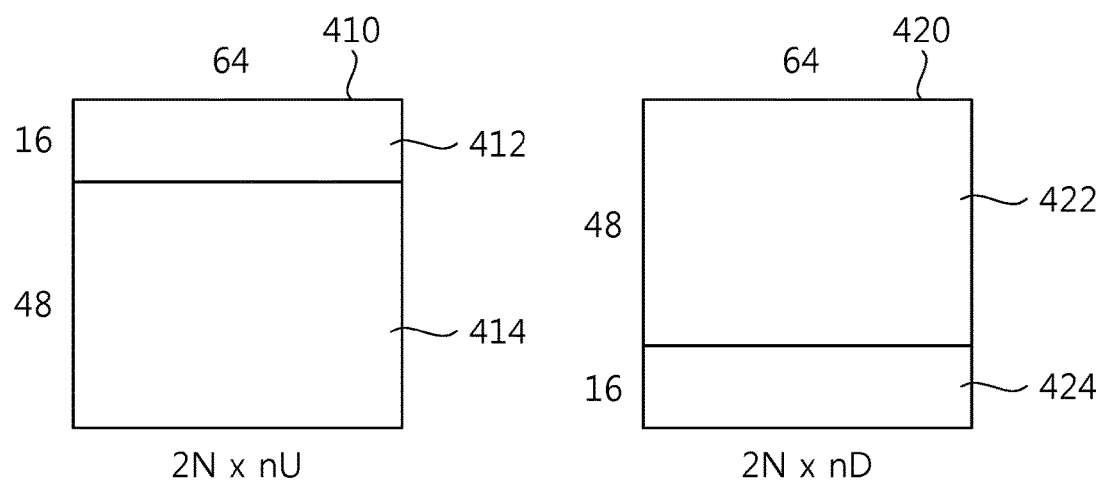
FIG. 4 schematically illustrates that an interpolation filter tap is used when asymmetric motion partitioning (AMP) is used in a vertical direction in the video encoding apparatus according to an exemplary embodiment of the present invention.

FIG. 4 schematically illustrates that an interpolation filter tap is used when asymmetric motion partitioning (AMP) is used as asymmetric in the vertical direction in the video encoding apparatus according to an exemplary embodiment of the present invention.

Referring to FIG. 4, when a PU is partitioned as AMP and a long filter tap, such as an 8-tap, is used for a shorter direction of an asymmetrical partition, pixels of a different partition are also involved in the interpolation. In this case, pixels have a weak correlation when belonging to different partitions, and thus interpolation efficiency is likely to decrease. That is, when the block 412 and the block 414 are interpolated together, interpolation efficiency decreases due to a weak correlation between the block 412 and the block 414. The same result is brought to the block 422 and the block 424.

According to the present embodiment, when a PU is partitioned as AMP, a smaller filter tap than a conventional filter tap may be used for interpolation in an asymmetric direction of an asymmetrically partitioned PU with a shorter length. For example, a smaller filter tap than an 8-tap may be used to perform interpolation of the asymmetrically partitioned PU with the shorter length. In an inter mode, a PU may have a 2N*2N, 2N*N, N*2N, N*N, 2N×nU, 2N×nD, nL×2N or nR×2N form. An 8-tap filter may be used for interpolation of a symmetrically partitioned PU, such as 2N*2N, 2N*N, N*2N and N*N PUs.

Referring to left illustration of FIG. 4, when the PU is partitioned as a shape of 2N×nU block 410, which is asymmetrically partitioned in the vertical direction, an upper block 412 is a partitioned block with a shorter length. The block 410 may include the upper block 412 and a lower block 414, in which a ratio between lengths in the vertical direction of the upper block 412 and the lower block 414 may be 16:48. Referring to a right illustration of FIG. 4, when the PU is partitioned as a shape of a 2N×nD block 420, which is asymmetrically partitioned in the vertical direction, a lower block 424 is a partitioned block with a shorter length. The block 420 may include an upper block 422 and the lower block 424, in which a ratio between lengths in the vertical direction of the upper block 422 and the lower block 424 may be 48:16. When asymmetrically partitioned in the vertical direction, the upper block 412 of the 2N×nU block 410 and the lower block 424 of the 2N×nD block 420 may be interpolated using a smaller tap in the vertical direction than in the horizontal direction. For example, when an 8-tap filter is used in the horizontal direction, a filter with a smaller tap than an 8-tap may be used in the vertical direction.

Figure 5:
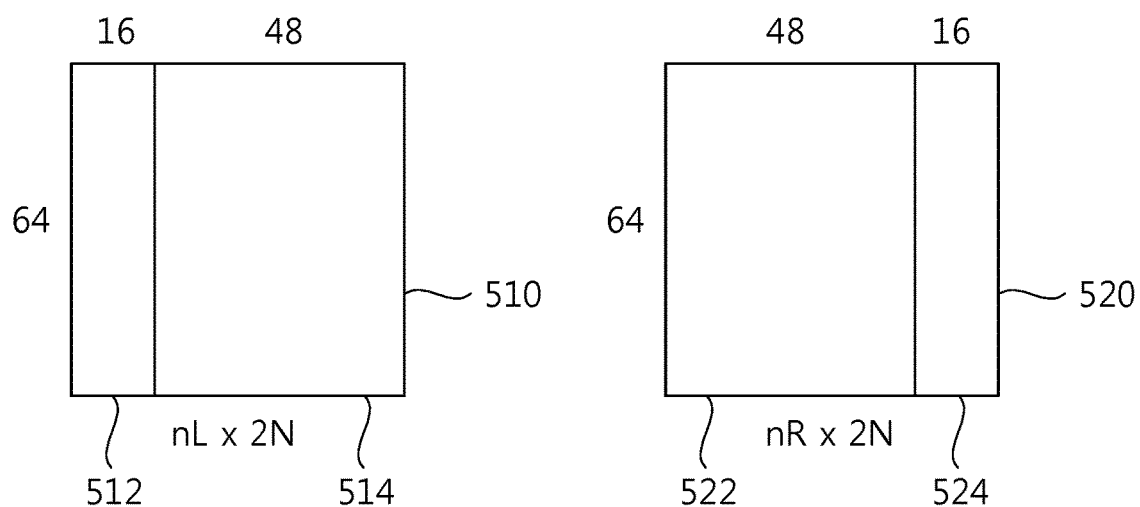
FIG. 5 schematically illustrates that an interpolation filter tap is used when AMP is used in a horizontal direction in the video encoding apparatus according to an exemplary embodiment of the present invention.

FIG. 5 schematically illustrates that an interpolation filter tap is used when AMP is used as asymmetric in the horizontal direction in the video encoding apparatus according to an exemplary embodiment of the present invention.

Referring to a left illustration of FIG. 5, when the PU is partitioned as a shape of an nL×2N block 510, which is asymmetrically partitioned in the horizontal direction, a left block 512 is a partitioned block with a shorter length. The block 510 may include the left block 512 and a right block 514, in which lengths in the vertical direction of the left block 512 and the right block 514 may be the same that is 64 while a ratio between lengths thereof in the horizontal direction may be 16:48. Referring to a right illustration of FIG. 5, when the PU is partitioned as a shape of a nR×2N block 520, which is asymmetrically partitioned in the horizontally direction, a right block 524 is a partitioned block with a shorter length. The block 520 may include a left block 522 and the right block 524, in which a ratio between lengths in the horizontal direction of the left block 522 and the right block 524 may be 48:16. When asymmetrically partitioned in the horizontal direction, the left block 512 of the nL×2N block 510 and the right block 524 of the nR×2N block 520 may be interpolated using a smaller tap in the horizontal direction than in the vertical direction. For example, a filter with a smaller tap than an 8-tap may be used in the horizontal direction.

Although exemplary embodiments of FIGS. 4 and 5 have been described with reference to a 64×64 block, the exemplary embodiments also can be applied for blocks with various sizes or shapes other than a 64×64 block.

Figure 6:
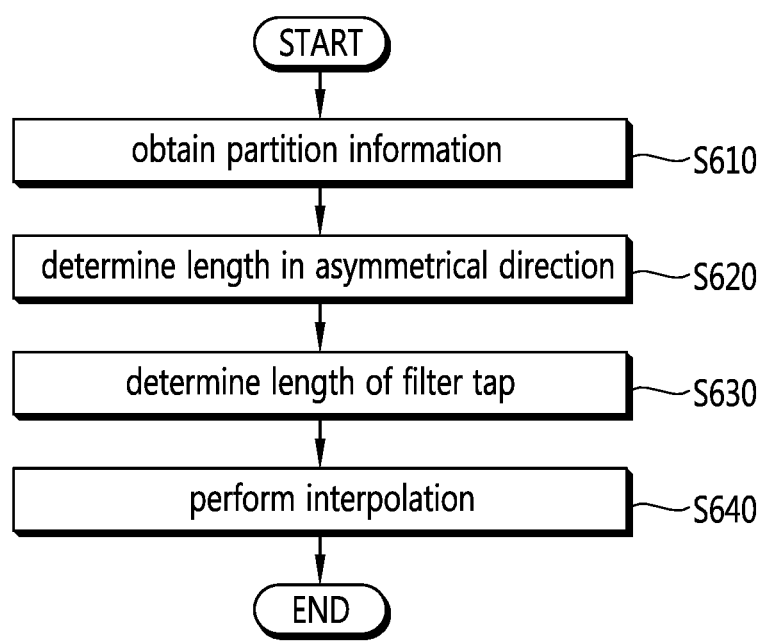
FIG. 6 is a flowchart schematically illustrating a process of performing inter prediction for an asymmetrically partitioned PU in the video encoding apparatus according to an exemplary embodiment of the present invention.

FIG. 6 is a flowchart schematically illustrating a process of performing inter prediction for an asymmetrically partitioned PU in the video encoding apparatus according to an exemplary embodiment of the present invention. As shown in FIG. 6, the process of performing inter prediction may include obtaining partition information (S610), determining a length in an asymmetric direction (S620), determining a length of a filter tap (S630) and performing interpolation (S640).

Referring to FIG. 6, in obtaining the partition information (S610), partition information on an asymmetrically partitioned block is obtained. In the encoding process, the partition information may be included in motion information on a current PU through motion estimation. The motion information may include information on a motion vector of the PU, a reference picture index, a prediction direction index, a prediction mode and a information on the shape of the PU.

According to the present embodiment, since a bitstream may be generated including information on a length of an interpolation filter tap of the PU corresponding to an encoding target block in the encoding process, the decoding apparatus may obtain information on the length of the interpolation filter tap of the PU corresponding to a decoding target block from the received bitstream. In this case, determining the length (S620) and determining the length of the filter tap (S630) may be omitted. When the bitstream does not include the information on the length of the filter tap, the information on the shape of the PU may be obtained, followed by determining the length (S620) and determining the length of the filter tap (S630), thereby determining the length of the filter tap.

In determining the length in the asymmetric direction (S620), the encoding apparatus (and/or decoding apparatus) determines a length in the asymmetric direction (either in the vertical direction or in the horizontal direction) of the PU corresponding to the encoding (and/or decoding) target block based on the obtained partition information. That is, the encoding apparatus determines whether an asymmetrically partitioned block in the horizontal direction has a longer length or shorter length.

Then, in determining the length of the filter tap (S630), the length of the filter tap for interpolation of the PU corresponding to the encoding (or decoding) target block is determined based on a result of determining the length. As described above, the length of the filter tap is determined based on a partitioned length in the asymmetric direction. For instance, the length of the filter tap may be determined such that tap with a shorter length in the vertical direction than in the horizontal direction is applied to an asymmetrically partitioned block having a shorter length in the vertical direction while tap with a shorter length in the horizontal direction than in the vertical direction is applied to an asymmetrically partitioned block having a shorter length in the horizontal direction.

In performing interpolation (S640), the encoding apparatus (and/or decoding apparatus) performs interpolation based on the length of the filter tap determined in determining the length of the filter (S630).

According to the present embodiment, in the encoding process, interpolation is performed based on the determined length of the filter tap, and a bitstream is generated including the information on the length of the filter tap.

Figure 7:
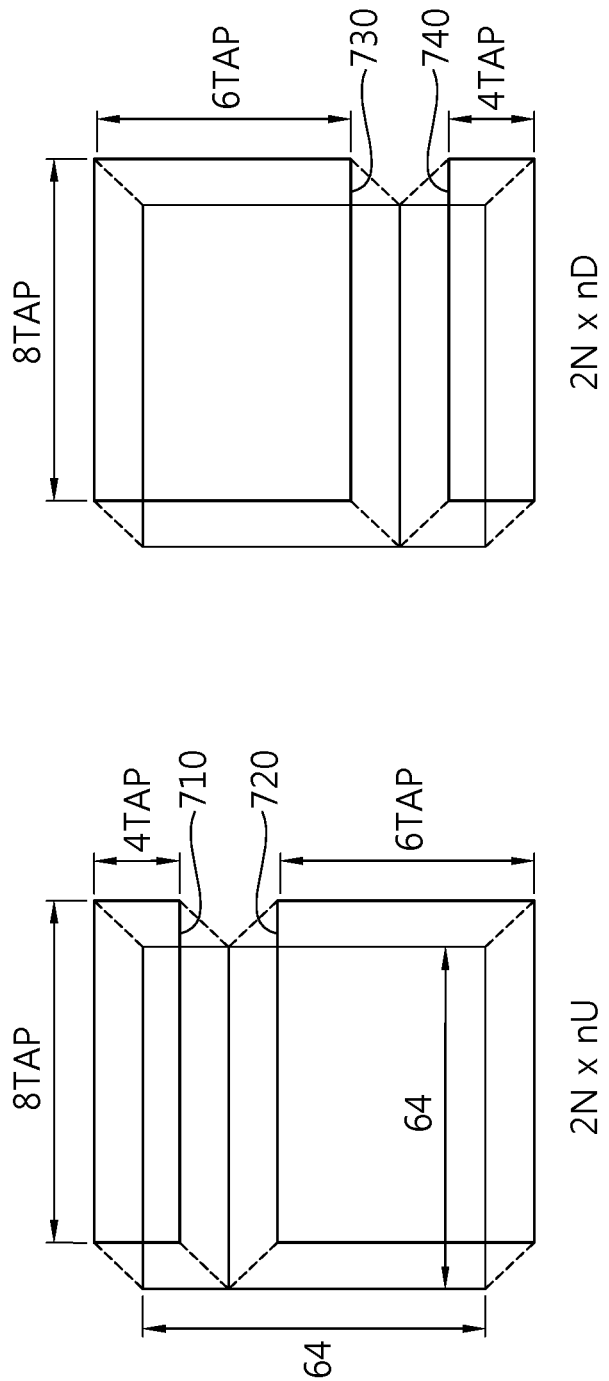
FIG. 7 schematically illustrates that an interpolation filter tap adequate for a vertical or horizontal length of a partitioned PU is used when AMP is used in the vertical direction in the video encoding apparatus according to an exemplary embodiment of the present invention.

FIG. 7 schematically illustrates that an interpolation filter tap adequate for a vertical or horizontal length of a partitioned PU is used when AMP is used in the vertical direction in the video encoding apparatus according to an exemplary embodiment of the present invention.

Referring to FIG. 7, interpolation may be performed for an asymmetrically partitioned block with a larger area using a filter with a longer tap than for an asymmetrically partitioned block with a smaller area. Further, a total length of filter taps in the asymmetrical direction of at least two partitioned blocks may be greater than a length of a filter tap in a direction other than the asymmetric direction.

Referring to a left illustration of FIG. 7, a 2N×nU block is asymmetrically partitioned in the vertical direction, wherein an upper block 710 is a partitioned block with a shorter length. The upper block 710 of the 2N×nU block has a shorter length in the vertical direction than a lower block 720, in which a ratio between lengths of the upper block 710 and the lower block 720 may be 16:48. In this case, a longer-tap filter may be used for the lower block 720 with a larger area than for the upper block 710 with a smaller area. Further, a total length of filter taps in the asymmetric direction, that is, a total length of a vertical filter tap of the upper block 710 and a vertical filter tap of the lower block 720, may be larger than a length of a horizontal filter tap for the upper block 710 and the lower block 720.

For example, a 4-tap filter may be used for the upper block 710 in interpolation for the vertical direction, while a 6-tap filter may be used for the lower block 720 in interpolation for the vertical direction. That is, a total tap length of the 4-tap filter and the 6-tap filter is 10, which is larger than a horizontal filter tap length of 8.

Referring to a right illustration of FIG. 7, the same manner may be applied to a 2N×nD block, in which case a 6-tap filter may be used for an upper block 730 in interpolation for the vertical direction, while a 4-tap filter may be used for a lower block 740 in interpolation for the vertical direction.

Figure 8:
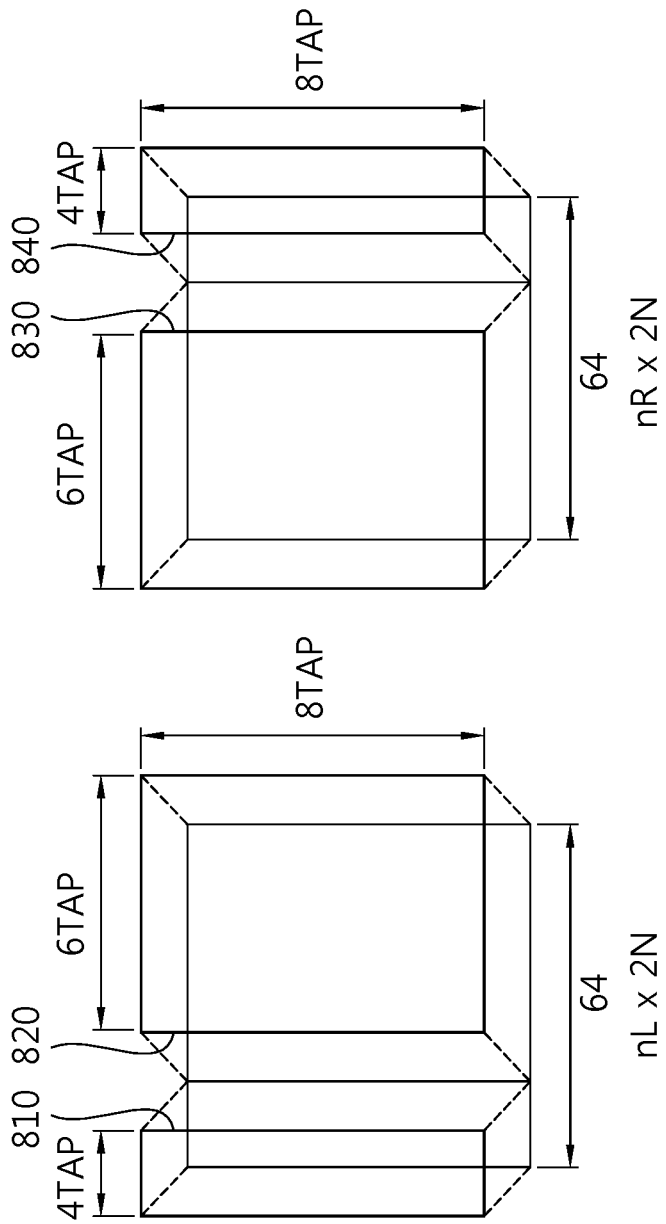
FIG. 8 schematically illustrates that an interpolation filter tap adequate for a vertical or horizontal length of a partitioned PU is used when AMP is used in the horizontal direction in the video encoding apparatus according to an exemplary embodiment of the present invention.

FIG. 8 schematically illustrates that an interpolation filter tap adequate for a vertical or horizontal length of a partitioned PU is used when AMP is used in the horizontal direction in the video encoding apparatus according to an exemplary embodiment of the present invention.

Referring to a left illustration of FIG. 8, an nL×2N block is asymmetrically partitioned in the horizontal direction, wherein a left block 810 is a partitioned block with a shorter length. The left block 810 of the nL×2N block has a shorter length in the horizontal direction than a right block 820, in which a ratio between lengths of the left block 810 and the right block 820 may be 16:48. In this case, a longer-tap filter may be used for the right block 820 with a larger area than for the left block 810 with a smaller area. Further, a total length of filter taps in the asymmetric direction, that is, a total length of a horizontal filter tap of the left block 810 and a horizontal filter tap of the right block 820, may be larger than a length of a vertical filter tap for the left block 810 and the right block 820.

For example, a 4-tap filter may be used for the left block 810 in interpolation for the horizontal direction, while a 6-tap filter may be used for the right block 820 in interpolation for the horizontal direction.

Referring to a right illustration of FIG. 8, the same manner may be applied to an nR×2N block, in which case a 6-tap filter may be used for a left block 830 in interpolation for the horizontal direction, while a 4-tap filter may be used for a right block 840 in interpolation for the horizontal direction.

Table 1 illustrates vertical and horizontal interpolation filter tap numbers of asymmetrical blocks.

TABLE 1

|  | Vertical filter tap | Horizontal filter tap |
| --- | --- | --- |
| 2N × nU (upper block) | 4 | 8 |
| 2N × nU (lower block) | 6 | 8 |
| 2N × nD (upper block) | 6 | 8 |
| 2N × nD (lower block) | 4 | 8 |
| nL × 2N (left block) | 4 | 8 |
| nL × 2N (right block) | 6 | 8 |
| nR × 2N (left block) | 6 | 8 |
| nR × 2N (right block) | 4 | 8 |

Figure 9:
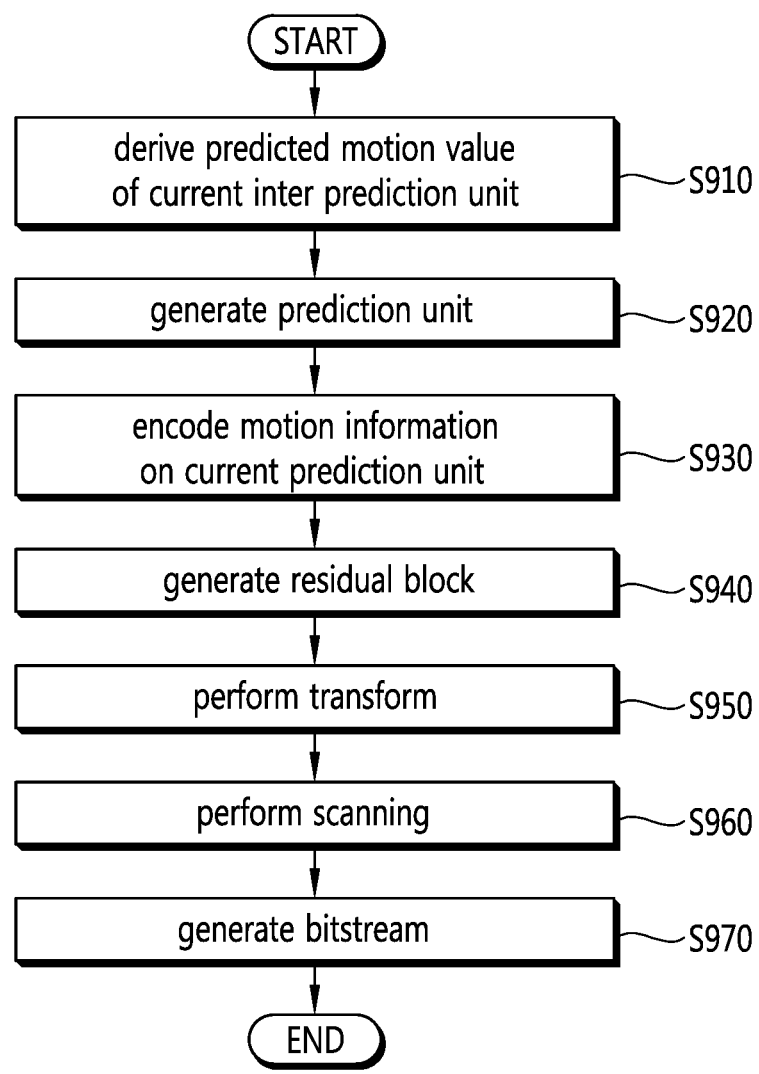
FIG. 9 is a flowchart schematically illustrating a video encoding method according to an exemplary embodiment of the present invention.

FIG. 9 is a flowchart schematically illustrating a video encoding method according to an exemplary embodiment of the present invention.

Referring to FIG. 9, the encoding apparatus may derive a predicted motion value of a current inter PU (S910). Motion information on the current PU is not transmitted as it is but differential value from predicated value obtained from temporally and spatially neighboring blocks are transmitted so as to enhance compression efficiency. The encoding apparatus may derive a merge candidate list and an advanced motion vector prediction (AMVP) candidate list for the current inter PU so as to derive the predicted motion value.

The encoding apparatus may generate a PU using the motion information (S920). Specifically, interpolation may be performed using a short-tap filter for an asymmetrically partitioned PU in a direction of a shorter partitioned length. Interpolation methods for the asymmetrically partitioned PU have been described above, and thus descriptions thereof are omitted herein.

The encoding apparatus may encode the motion information on the current block (S930). In a merge mode, if a candidate having the same motion information as the current PU is present among merge candidates, the encoding apparatus indicates that the current PU is in the merge mode and transmits a flag indicating that the merge mode is used and an index indicating which candidate is used among the merging candidates. In an AMVP mode, the encoding apparatus determines a candidate minimizing a cost function among AMVP candidates by comparing motion vector information between the AMVP candidates and the current PU, and performs motion compensation using the determined candidate and a differential value in motion information between the current PU and the AMVP candidate to obtain a residual signal.

The encoding apparatus may generate a residual block corresponding to the current block (S940). As described above, the encoding apparatus may perform inter prediction and/or intra prediction for the current block, thereby generating a prediction block corresponding to the current block. Here, the encoding apparatus may generate a residual signal, that is, the residual block, by obtaining a difference by pixels between a pixel value of the current block and a pixel value of the prediction block.

In FIG. 9, the encoding apparatus may transform the residual signal, that is, the residual block (S950). The encoding apparatus may perform transcoding on the residual signal by using a transform kernel, and the transform kernel may have a 2×2, 4×4, 8×8, 16×16, 32×32 or 64×64 size. In one exemplary embodiment, a transform coefficient C for an n×n block may be calculated as follows.

$$C(n,n) = T(n,n) \times B(n,n) \times T(n,n)^T \qquad \text{[Equation 3]}$$

Here, C(n,n) is an n×n transform coefficient matrix, T(n,n) is an n×n transform kernel matrix, and B(n,n) is an n×n matrix of a residual block.

When a transform coefficient is generated via transformation, the encoding apparatus may quantize the generated transform coefficient.

The encoding apparatus may determine based on RDO which to transmit among the residual block and the transform coefficient. When prediction is properly done, the residual block, that is, the residual signal, may be transmitted as it is, without transcoding. The encoding apparatus may compare cost functions before/after transcoding and select a method involving minimum cost. Here, the encoding apparatus may transmit information on a type of a signal (residual signal or transform coefficient) to be transmitted with respect to the current block to the decoding apparatus.

In FIG. 9, the encoding apparatus may scan the transform coefficient (S960).

When scanning is done, the encoding apparatus may entropy-encode the scanned transform coefficient and side information (for example, information on an inter prediction mode of the current block) (S970). The encoded information may be formed into a compressed bitstream and be stored in a medium or transmitted through an NAL.

Although the encoding method is described with a series of stages based on the flowchart in FIG. 9, the present invention is not limited thereto. Some stages of FIG. 9 may be carried out in different order from described above or in parallel. Further, additional stages may be included between stages in the flowchart, or one or more stages may be deleted from the flowchart of FIG. 9 within the scope of the present invention.

Figure 10:
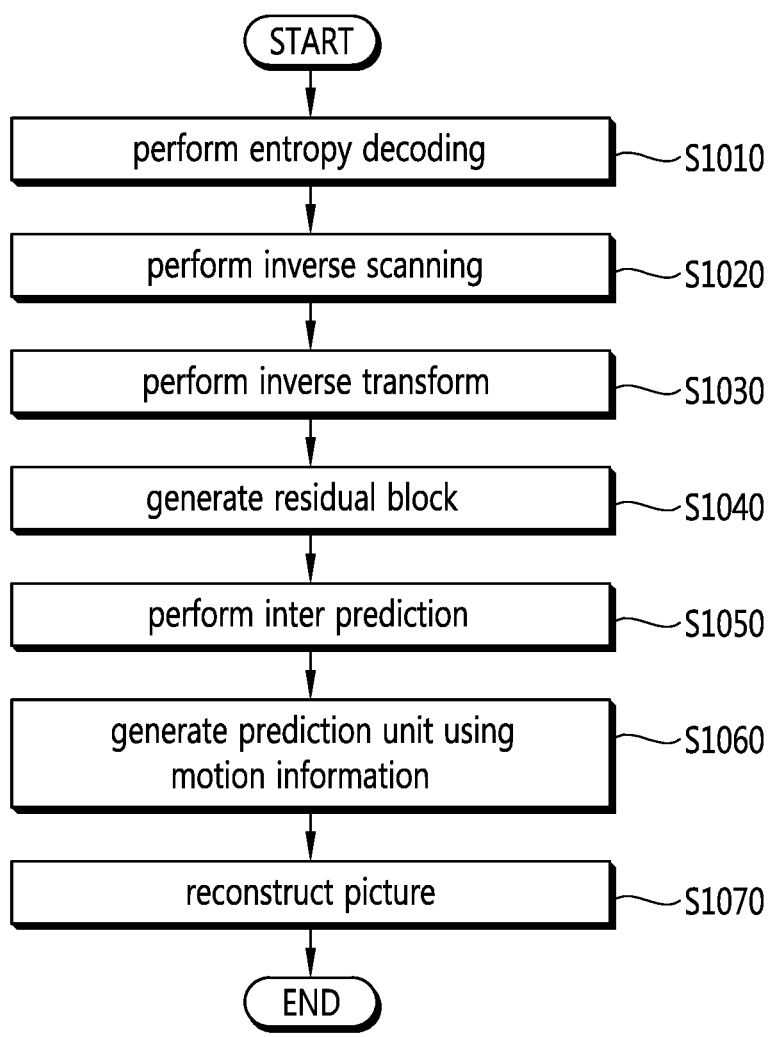
FIG. 10 is a flowchart schematically illustrating a video decoding method according to an exemplary embodiment of the present invention.

FIG. 10 is a flowchart schematically illustrating a video decoding method according to an exemplary embodiment of the present invention.

Referring to FIG. 10, the decoding apparatus may entropy-decode a bitstream received from the encoding apparatus (S1010). For instance, the decoding apparatus may derive a prediction mode and a residual signal of a current block based on a variable length coding (VLC) table and/or CABAC. The decoding apparatus may obtain information on whether a signal received with respect to the current block is the residual signal or a transform coefficient. And the decoding apparatus may obtain the residual signal or a 1D vector of transform coefficients for the current block. When the received bitstream includes side information needed for decoding, both the bitstream and the side information may be entropy-decoded.

In FIG. 10, the decoding apparatus may inverse-scan the entropy-decoded residual signal or transform coefficients to generate a two-dimensional block (S1020). Here, a residual block may be generated in the case of the residual signal, and a two-dimensional block of transform coefficients may be generated in the case of the transform coefficients. When the transform coefficients are generated by entropy-decoding, the decoding apparatus may dequantize the generated transform coefficients (S1030).

The decoding apparatus may inverse-transform the dequantized transform coefficients, thereby generating a residual block (S1040). Inverse transformation may be represented by Equation 4.

$$B(n,n)=T(n,n) \times C(n,n) \times T(n,n)^T$$ [Equation 4]

When the residual block is generated, the decoding apparatus may perform inter prediction based on the residual block (S1050). The decoding apparatus performs inter prediction using one of the merge mode and the AMVP mode to obtain motion information.

The decoding apparatus may generate a PU using the obtained motion information. Interpolation may be performed using a short-tap filter for an asymmetrically partitioned PU in a direction of a shorter partitioned length. Interpolation methods for the asymmetrically partitioned PU have been described above, and thus descriptions thereof are omitted herein.

The decoding apparatus may add signal of the residual block and a signal obtained using previous frame to generate a reconstructed block, thereby reconstructing a picture (S1070). As described above, the decoding apparatus may perform inter prediction and may perform intra prediction also for a decoding target block to generate a prediction block corresponding to the decoding target block. Here, the decoding apparatus may add a pixel value of the prediction block and a pixel value of the residual block by a pixel, thereby generating the reconstructed block.

Although the decoding method is described with a series of stages based on the flowchart in FIG. 10, the present invention is not limited thereto. Some stages of FIG. 10 may be carried out in different order from described above or in parallel. Further, additional stages may be included between stages in the flowchart, or one or more stages may be deleted from the flowchart of FIG. 10 within the scope of the present invention.

While methods have been described with a series of stages or blocks based on the flowcharts in the aforementioned embodiments, the present invention is not limited to the foregoing sequence of the stages. Some stages may be carried out in different order from described above or at the same time. Also, it will be understood by those skilled in the art that the stages illustrated in the flowcharts are not exclusive, additional stages may be included in the flowchart, or one or more stages may be deleted from the flowcharts without affecting the scope of the present invention.

The present invention has been described with reference to the exemplary embodiments, and the foregoing embodiments include various aspects of examples. Although all possible combinations may not be mentioned to illustrate various aspects, it will be appreciated by those skilled in the art that changes, modifications and alternatives may be made in these exemplary embodiments without departing from the principles and spirit of be the invention, the scope of which is defined in the appended claims and their equivalents.

The invention claimed is:

1. A method of decoding a video signal having a current block to be decoded with a decoding apparatus, comprising:
   obtaining residual coefficients of the current block from the video signal;
   deriving inverse-quantized residual coefficient by inverse-quantizing the residual coefficients;
   deriving residual samples of the current block by performing an inverse-transform on the inverse-quantized residual coefficients of the current block;
   selecting a reference picture of the current block by using a reference index of the current block;
   determining a reference block in the reference picture by using a motion vector of the current block;
   generating reference samples in the reference block,
      wherein generating the reference samples comprises:
         deriving a first sub-sample based on a horizontal interpolation filter and a shifting operation using a first shifting value, the horizontal interpolation filter being applied to an integer sample in the reference picture; and
         deriving a second sub-sample based on a vertical interpolation filter and a shifting operation using a second shifting value, the second sub-sample being one of two quarter position samples and a half position sample which are vertically aligned below the first sub-sample, and the vertical interpolation filter being applied to the first sub-sample; and
   obtaining prediction samples of the current block by using the reference samples;
   obtaining reconstruction samples of the current block by using the residual samples and the prediction samples; and
   applying a deblocking filter to the reconstruction samples of the current block,
   wherein coefficients of the vertical interpolation filter defined for each of the two quarter position samples and the half position sample are different from each other, and
   wherein the first shifting value is determined based on a bit depth of a luma component while the second shifting value has a fixed value.

2. The method of claim 1, the method further comprising:
   generating a merge candidate list of the current block, the merge candidate list including multiple merge candidates; and
   obtaining the reference index and the motion vector of the current block by using a merge candidate among the multiple merge candidates that corresponds to a merge index of the current block.

3. The method of claim 2, wherein the multiple merge candidates include a spatial neighboring block of the current block and a temporal neighboring block of the current block.

4. The method of claim 1, wherein a number of non-zero real-number among coefficients of the vertical interpolation filter defined for at least one of the two quarter position samples or the half position sample, is different from a number of non-zero real-number among coefficients of the horizontal interpolation filter.

* * * * *